(12) United States Patent
Nakazono et al.

(10) Patent No.: US 9,790,886 B2
(45) Date of Patent: Oct. 17, 2017

(54) GAS ENGINE, GAS HEAT PUMP SYSTEM AND COGENERATION SYSTEM USING THE GAS ENGINE, AND METHOD FOR CONTROLLING THE GAS ENGINE

(71) Applicant: YANMAR CO., LTD., Osaka (JP)

(72) Inventors: Toru Nakazono, Osaka (JP); Hiroyuki Otsubo, Osaka (JP); Hirotoshi Kihara, Osaka (JP)

(73) Assignee: YANMAR CO., LTD., Osaka-Shi (JP)

( * ) Notice: Subject to any disclaimer, the term of this patent is extended or adjusted under 35 U.S.C. 154(b) by 550 days.

(21) Appl. No.: 14/354,250

(22) PCT Filed: Oct. 9, 2012

(86) PCT No.: PCT/JP2012/076119
§ 371 (c)(1),
(2) Date: Apr. 25, 2014

(87) PCT Pub. No.: WO2013/061768
PCT Pub. Date: May 2, 2013

(65) Prior Publication Data
US 2014/0311448 A1   Oct. 23, 2014

(30) Foreign Application Priority Data

Oct. 25, 2011   (JP) .................................. 2011-233851

(51) Int. Cl.
*F02M 7/00*   (2006.01)
*F02D 41/30*   (2006.01)
(Continued)

(52) U.S. Cl.
CPC ......... *F02D 41/30* (2013.01); *F02D 41/0027* (2013.01); *F02D 41/3064* (2013.01); *F02M 21/0248* (2013.01); *Y02T 10/32* (2013.01)

(58) Field of Classification Search
CPC .... Y02T 10/44; F02D 41/1475; F01N 13/009
(Continued)

(56) References Cited

U.S. PATENT DOCUMENTS 4,046,118 A * 9/1977 Aono .................. F02D 35/0053
                                                            123/683
4,119,074 A * 10/1978 Masaki ............... F02D 41/1474
                                                            123/683
(Continued)

FOREIGN PATENT DOCUMENTS

JP    07-063075 A    3/1995
JP    07-077076 A    3/1995
(Continued)

OTHER PUBLICATIONS

International Search Report dated Nov. 6, 2012, issued for PCT/JP2012/076119.

*Primary Examiner* — Marguerite McMahon
*Assistant Examiner* — James Kim
(74) *Attorney, Agent, or Firm* — Locke Lord LLP; Howard M. Gitten

(57) ABSTRACT

A gas engine 1 which operates in stoichiometric mode under high-load conditions and which operates in lean burn mode under medium- and low-load conditions includes a valve 2 which supplies the gas engine 1 with an air-fuel mixture composed of air and fuel gas. In the valve 2, a valve unit 21 for stoichiometric operation is connected in series to a valve unit 22 for lean burn operation and is also connected to a mixer 24. An opening area of the valve 2 is controlled in such a manner as to ensure a predetermined opening area for effecting stoichiometric operation, to uniformly decrease the opening area over time until a switching operation from stoichiometric operation to lean burn operation ends, to ensure a predetermined opening area for effecting lean burn operation, and to uniformly increase the opening area over (Continued)

time until a switching operation from lean burn operation to stoichiometric operation ends.

17 Claims, 4 Drawing Sheets

(51) Int. Cl.
*F02D 41/00* (2006.01)
*F02M 21/02* (2006.01)

(58) Field of Classification Search
USPC .......................................... 123/344
See application file for complete search history.

(56) References Cited

U.S. PATENT DOCUMENTS

| | | | | | |
|---|---|---|---|---|---|
| 4,279,230 | A | * | 7/1981 | Bauer | ................. F02D 35/0053 123/680 |
| 4,364,357 | A | * | 12/1982 | Matsuoka | ........... F02D 41/1484 123/699 |
| 4,367,713 | A | * | 1/1983 | Otsuka | .................... F02D 41/12 123/682 |
| 6,189,523 | B1 | * | 2/2001 | Weisbrod | .............. F02D 31/002 123/27 GE |
| 7,663,256 | B2 | * | 2/2010 | Yuri | .......................... F02G 5/04 123/41.01 |
| 2009/0199813 | A1 | * | 8/2009 | Kuzuyama | ................ F02B 1/12 123/27 R |
| 2010/0154761 | A1 | * | 6/2010 | Okumura | .............. F02B 31/085 123/676 |

FOREIGN PATENT DOCUMENTS

| | | |
|---|---|---|
| JP | 2000-024465 A | 1/2000 |
| JP | 2003-254106 A | 9/2003 |
| JP | 2006-322403 A | 11/2006 |
| JP | 2011-122484 A | 6/2011 |

* cited by examiner

GAS ENGINE, GAS HEAT PUMP SYSTEM AND COGENERATION SYSTEM USING THE GAS ENGINE, AND METHOD FOR CONTROLLING THE GAS ENGINE

TECHNICAL FIELD

The present invention relates to a gas engine, a gas heat pump system and a cogeneration system using the gas engine, a method for controlling the gas engine.

BACKGROUND ART

Gas engines are known as drive sources in gas heat pump systems and cogeneration systems.

Conventionally, a gas engine which switches between stoichiometric operation and lean burn operation is disclosed (for example, see Patent Literature 1).

PRIOR ART DOCUMENT

Patent Document

[Patent document 1] JP 2000-24465 A

DISCLOSURE OF THE INVENTION

Problems to be Solved by the Invention

However, in the case of the conventional gas engine which switches between stoichiometric operation and lean burn operation, the excess air ratio to be controlled in lean burn operation ($\lambda$1.4 to 1.6) has a range, compared with the excess air ratio to be controlled in stoichiometric operation ($\lambda=1$, stoichiometric air-fuel ratio). Due to a significant difference between the control accuracy in stoichiometric operation and the control accuracy in lean burn operation, an air-fuel ratio control valve for lean burn operation could shift from lean burn operation to stoichiometric operation, but could not control the excess air ratio to the stoichiometric air-fuel ratio ($\lambda=1$) in stoichiometric operation.

Alternatively, it was conceived to employ an air-fuel ratio control valve for stoichiometric operation. However, since the control accuracy was set for stoichiometric operation, the valve for stoichiometric operation could not increase the excess air ratio to the region for lean burn operation.

It was further conceived to switch between an air-fuel ratio control valve for stoichiometric operation and an air-fuel ratio control valve for lean burn operation so as to cover both operations. Still in this case, the significant difference in control accuracy between these valves hampers a smooth shift in the switching process. Particularly in the case of a gas engine, while shifting between stoichiometric operation and lean burn operation, the engine must go through an excess air ratio region ($\lambda=1$ to 1.3) where NOx emission in the exhaust gas is high. Hence, failure to make a smooth shift between stoichiometric operation and lean burn operation might cause various disadvantages including a temporary increase in NOx concentration in the exhaust gas and greater variations in engine speed.

The present invention provides a gas engine which can smoothly switch between stoichiometric operation and lean burn operation, a gas heat pump system and a cogeneration system using the gas engine, and a method for controlling the gas engine.

Means for Solving the Problems

In order to solve the above problem, the present invention provides a gas engine which operates in stoichiometric mode under high-load conditions and which operates in lean burn mode under medium- and low-load conditions. The gas engine includes a valve which supplies the gas engine with an air-fuel mixture composed of air and fuel gas. An opening area of the valve is controlled in such a manner as: to ensure a predetermined opening area for achieving an excess air ratio for stoichiometric operation; during a switching operation from stoichiometric operation to lean burn operation, to uniformly decrease the opening area and increase the excess air ratio over time until the switching operation from stoichiometric operation to lean burn operation ends; to ensure a predetermined opening area for achieving an excess air ratio for lean burn operation; and during a switching operation from lean burn operation to stoichiometric operation, to uniformly increase the opening area and decrease the excess air ratio over time until the switching operation from lean burn operation to stoichiometric operation ends.

In this gas engine, the valve includes a valve unit for stoichiometric operation for achieving the excess air ratio for stoichiometric operation, and a valve unit for lean burn operation for achieving the excess air ratio for lean burn operation. The opening area of the valve is controlled, with the valve unit for stoichiometric operation being connected in series to the valve unit for lean burn operation and being connected to an intake side of the engine.

During stoichiometric operation, the opening area of the valve may be controlled by the valve unit for stoichiometric operation, with the valve unit for lean burn operation being kept fully open. During the switching operation from stoichiometric operation to lean burn operation, the opening area of the valve may be controlled by opening the valve unit for stoichiometric operation fully and closing the valve unit for lean burn operation.

During lean burn operation, the opening area of the valve may be controlled by the valve unit for lean burn operation, with the valve unit for stoichiometric operation being kept fully open. During the switching operation from lean burn operation to stoichiometric operation, the opening area of the valve may be controlled by opening the valve unit for lean burn operation fully and closing the valve unit for stoichiometric operation.

During the switching operation from stoichiometric operation to lean burn operation or the switching operation from lean burn operation to stoichiometric operation, the opening area of the valve may be controlled by computationally estimating a sum of an opening area of the valve unit for stoichiometric operation and an opening area of the valve unit for lean burn operation.

Further to solve the above problem, the present invention provides a gas heat pump system equipped with the above-mentioned gas engine.

Yet further to solve the above problem, the present invention provides a cogeneration system equipped with the above-mentioned gas engine.

Still further to solve the above problem, the present invention provides a method for controlling a gas engine which operates in stoichiometric mode under high-load conditions and which operates in lean burn mode under medium- and low-load conditions, the gas engine including a valve which supplies the gas engine with an air-fuel mixture composed of air and fuel gas. The method includes the step of controlling an opening area of the valve by; during stoichiometric operation, ensuring a predetermined opening area for achieving an excess air ratio for stoichiometric operation; during a switching operation from stoichiometric operation to lean burn operation, uniformly decreasing the opening area and increasing the excess air ratio over time until the switching operation from stoichiometric operation to lean burn operation ends; during lean burn operation, ensuring a predetermined opening area for achieving an excess air ratio for lean burn operation; and during a switching operation from lean burn operation to stoichiometric operation, uniformly increasing the opening area and decreasing the excess air ratio over time until the switching operation from lean burn operation to stoichiometric operation ends.

Effects of the Invention

As mentioned above, the present invention can prevent a temporary increase in NOx concentration and greater variations in engine speed.

Since this gas engine operates in stoichiometric mode under high-load conditions and operates in lean burn mode under medium- and low-load conditions, the gas engine is capable of operating under a wider range of load conditions. If this gas engine is used in various types of equipment including a gas heat pump system and a cogeneration system, even a small-displacement gas engine can be most suitable and can contribute to cost cutting and energy saving.

Therefore, the gas heat pump using this gas engine can enhance the annual performance factor (APF). In addition, the cogeneration system using this gas engine can enhance overall energy efficiency.

MODE FOR CARRYING OUT THE INVENTION

Hereinafter, an embodiment according to the present invention is described with reference to the drawings.

Figure 1:
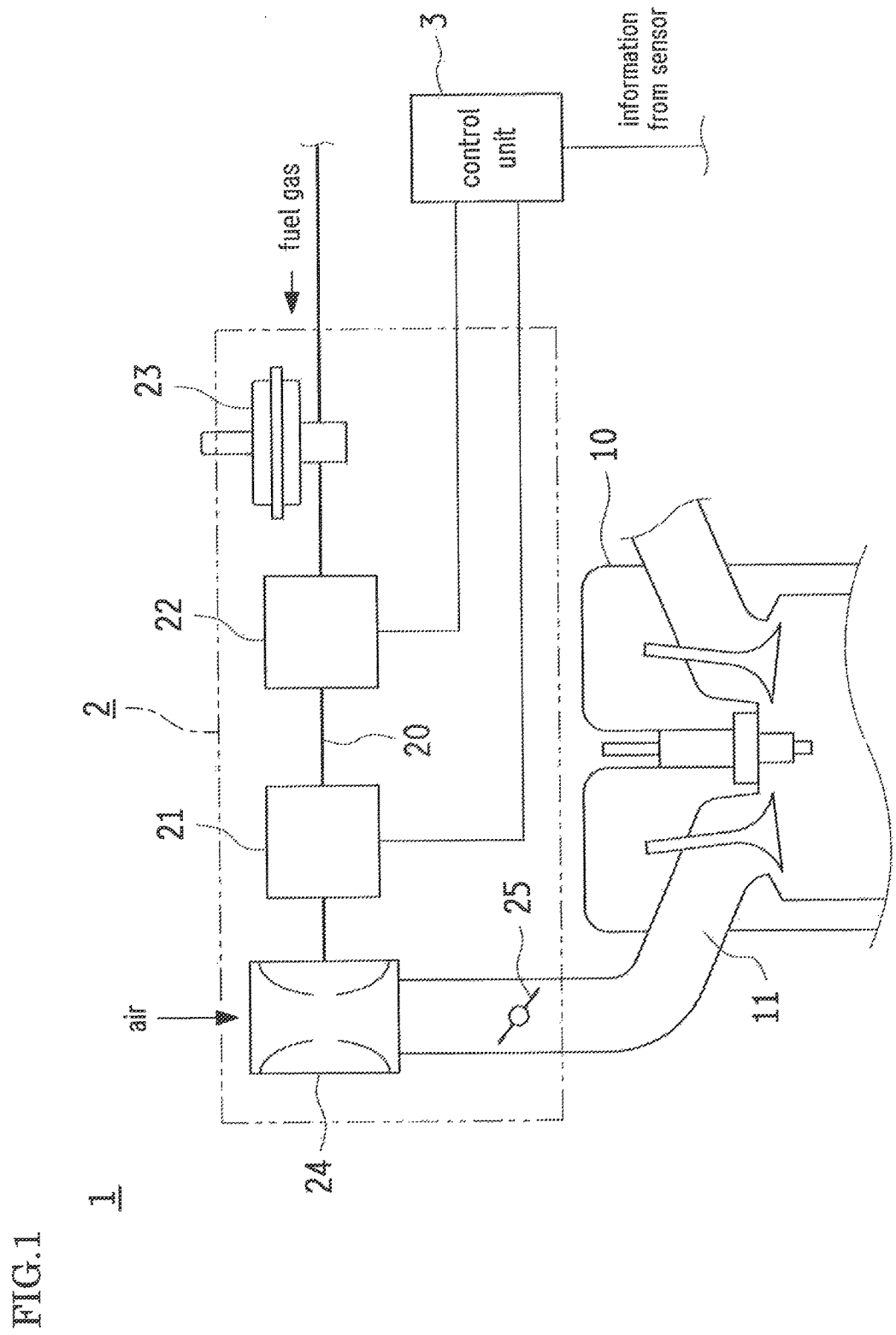
FIG. 1 is a block diagram illustrating an entire configuration of a gas engine according to the present invention.
Figure 2:
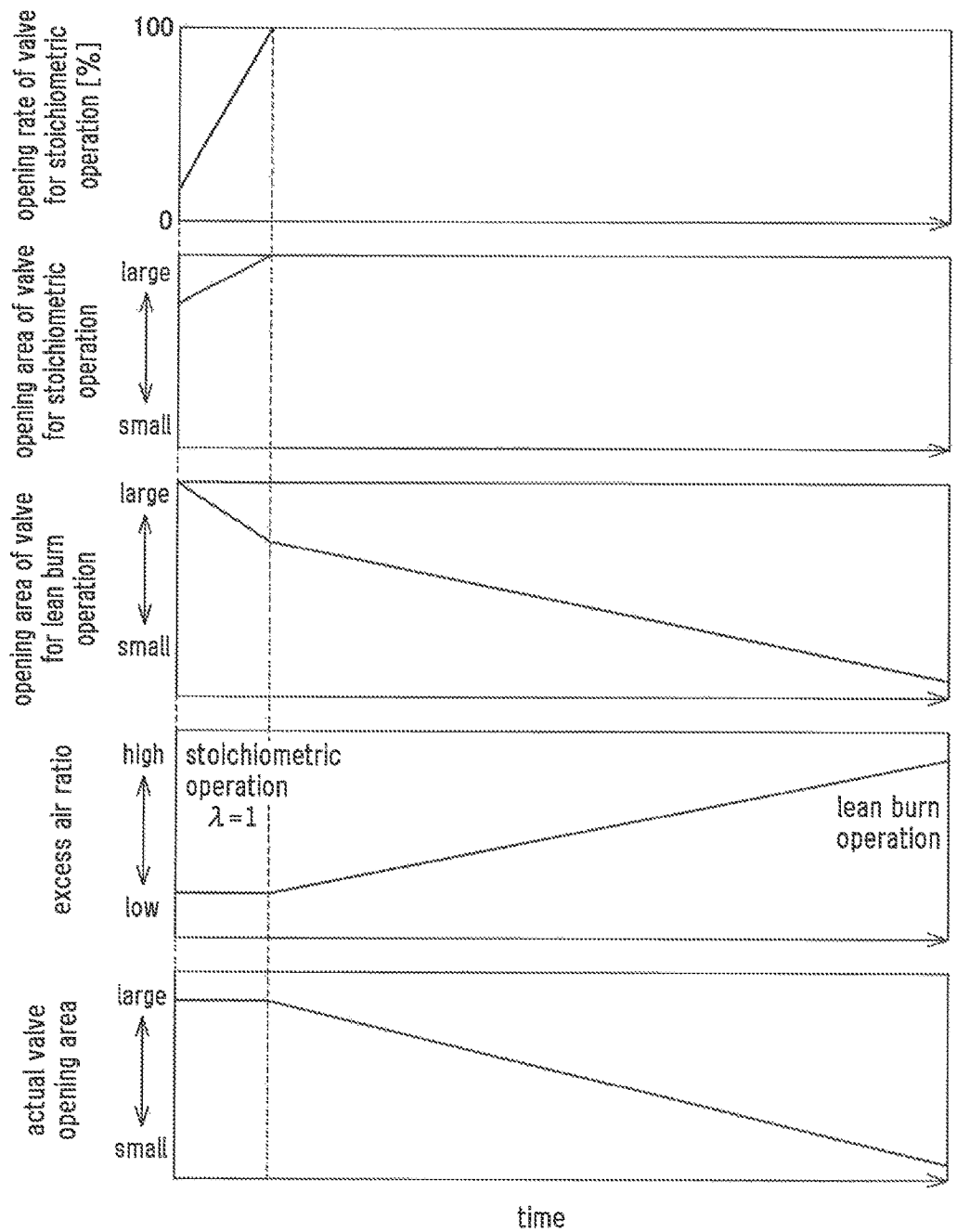
FIG. 2 is graph showing changes in valve opening areas, while the gas engine according to the present invention shifts from stoichiometric operation to lean burn operation.
Figure 3:
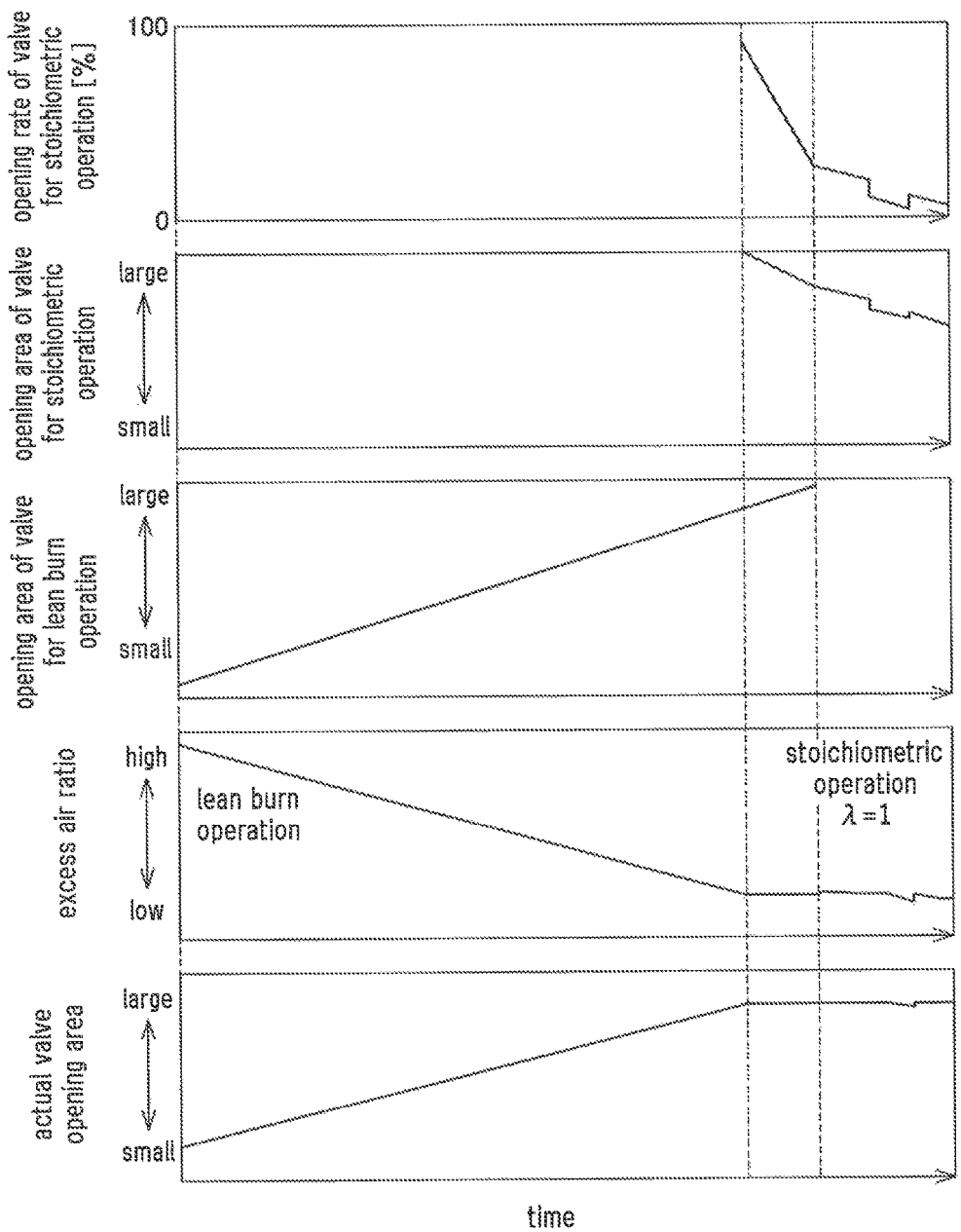
FIG. 3 is a graph showing changes in valve opening areas, while the gas engine according to the present invention shifts from lean burn operation to stoichiometric operation.

FIG. 1 is a block diagram illustrating an entire configuration of a gas engine 1. FIG. 2 shows changes in valve opening areas while the gas engine 1 shifts from stoichiometric operation to lean burn operation. FIG. 3 shows changes in valve opening areas while the gas engine 1 shifts from lean burn operation to stoichiometric operation.

The gas engine 1 is configured to operate in stoichiometric mode under high-load conditions and to operate in lean burn mode under medium- and low-load conditions. A valve 2 is composed of, from a mixer 24 side to a regulator 23 side, a valve unit 21 for stoichiometric operation for achieving an excess air ratio for stoichiometric operation, and a valve unit 22 for lean burn operation for achieving an excess air ratio for lean burn operation. The valve units 21 and 22 are connected in series between the regulator 23 and the mixer 24, with the valve unit 21 for stoichiometric operation being connected to the mixer 24.

The valve unit 21 for stoichiometric operation is composed of a proportional control valve which is designed to adjust an opening area for flowing fuel gas, in order to control the excess air ratio to the stoichiometric air-fuel ratio ($\lambda=1$) in a pinpoint manner. The valve unit 21 for stoichiometric operation is not particularly limited as far as its flow characteristics allow the excess air ratio to be controlled to the stoichiometric air-fuel ratio ($\lambda=1$) in a predetermined valve opening rate range from 0 to 100%. However, considering the necessity for keeping up with changes in atmospheric temperatures in the environment where the gas engine 1 is operated and changes in the operating engine speed range of the gas engine 1, the valve unit 21 for stoichiometric operation in actual use has such an accuracy and flow characteristics as to be capable of controlling the excess air ratio to the stoichiometric air-fuel ratio ($\lambda=1$) while keeping up with these changes.

The valve unit 22 for lean burn operation is composed of a proportional control valve which is designed to adjust an opening area for a fuel gas passage 20, in order to control the excess air ratio to a range for lean combustion ($\lambda=1.4$ to 1.6). Flow characteristics of this proportional control valve are designed to fully open the fuel gas passage 20 at a valve opening rate of 100%. Namely, the valve unit 22 for lean burn operation is provided upstream of the gas to be supplied to the valve unit 21 for stoichiometric operation, i.e. between the regulator 23 and the valve unit 21 for stoichiometric operation. Hence, while the valve unit 21 for stoichiometric operation controls the excess air ratio to the stoichiometric air-fuel ratio ($\lambda=1$), the valve unit 22 should be fully open at a valve opening rate of 100% so as not to interfere with the valve unit 21 for stoichiometric operation. In consideration of these requirements, the valve unit 22 for lean burn operation is designed to be capable of controlling the excess air ratio to a range for lean combustion ($\lambda=1.4$ to 1.6), in a predetermined valve opening rate range from 0 to 100%, and is also designed to open the fuel gas passage 20 fully at a valve opening rate of 100% without interfering with the valve unit 21 for stoichiometric operation while the valve unit 21 controls the excess air ratio to the stoichiometric air-fuel ratio ($\lambda=1$). Eventually, the valve unit 22 for lean burn operation controls the excess air ratio partially in cooperation with the valve unit 21 for stoichiometric operation.

The regulator 23 is configured to control the fuel gas pressure such that fuel gas can be continuously supplied at a constant pressure.

The mixer 24 is composed of a Venturi tube for mixing fuel gas and air. The mixer 24 is configured to mix fuel gas and air by Venturi effect due to intake air in proportion to the valve opening rate of a throttle 25 provided downstream of the mixer 24.

The valve 2 of the above configuration is connected to an intake port 11 of a cylinder head 10 in the gas engine 1. In the gas engine 1, a sensor (not shown) for measuring the oxygen concentration or the like in the exhaust gas is provided in an exhaust passage or the like. The excess air ratio is measured based on the measurement result from the sensor. The gas engine 1 can smoothly switch between stoichiometric operation and lean burn operation by controlling the valve 2 and other elements by a control unit 3, based on the measurement result from the sensor or the like. Although the NOx concentration in the exhaust gas increases during stoichiometric operation, NOx is subjected to reduction treatment by a three-way catalyst provided in the exhaust passage.

Next description is directed to the manner of controlling the gas engine 1 by the control unit 3.

If the driving environment requires a high-power operation, the gas engine 1 is operated in stoichiometric mode. For stoichiometric operation, the valve opening rate of the valve unit 21 for stoichiometric operation is controlled to adjust the excess air ratio to the stoichiometric air-fuel ratio ($\lambda=1$). An increase in the valve opening rate of the valve unit 21 for stoichiometric operation causes an increase in the opening area and an increase in the fuel gas concentration; namely, a decrease in the excess air ratio. A decrease in the valve opening rate causes a decrease in the opening area and a decrease in the fuel gas concentration; namely, an increase in the excess air ratio.

During stoichiometric operation, the valve unit 22 for lean burn operation is kept fully open at a valve opening rate of 100%, so as not to interfere with the valve unit 21 for stoichiometric operation while the valve unit 21 controls the excess air ratio to the stoichiometric air-fuel ratio ($\lambda=1$).

During stoichiometric operation as described above, if the driving environment no longer requires a high-power operation, the gas engine 1 switches from stoichiometric operation to lean burn operation (excess air ratio $\lambda$1.4 to 1.6).

A switching operation from stoichiometric operation to lean burn operation is described with reference to FIG. 2. The valve opening rate of the valve unit 21 for stoichiometric operation is increased to 100%, i.e. in the fully open state, so as not to interfere with the valve unit 22 for lean burn operation while the valve unit 22 controls the excess air ratio $\lambda$ to the range of 1.4 to 1.6. However, while the valve unit 21 for stoichiometric operation increases the opening area, the excess air ratio decreases undesirably. Hence, in synchronization with the increase in the opening area of the valve unit 21 for stoichiometric operation, the valve opening rate of the valve unit 22 for lean burn operation, which has been fully open so as not to interfere with stoichiometric operation, is gradually decreased from 100%. Since the opening area of the valve unit 22 for lean burn operation decreases, the control of the excess air ratio is taken over from the valve unit 21 for stoichiometric operation by the valve unit 22 for lean burn operation, with the excess air ratio being substantially kept at the stoichiometric air-fuel ratio ($\lambda=1$). To synchronize the decrease in the opening area of the valve unit 22 for lean burn operation with the increase in the opening area of the valve unit 21 for stoichiometric operation, the change in the valve opening rate of the valve unit 22 for lean burn operation relative to the change in the valve opening rate of the valve unit 21 for stoichiometric operation is computationally estimated. Specifically, the computational estimation is performed such that the rate of increase in the opening area resulting from the change in the valve opening rate of the valve unit 21 for stoichiometric operation matches the rate of decrease in the opening area resulting from the change in the valve opening rate of the valve unit 22 for lean burn operation, based on the control accuracy of the valve unit 21 for stoichiometric operation and the control accuracy of the valve unit 22 for lean burn operation.

Thereafter, by controlling the valve opening rate of the valve unit 22 for lean burn operation, the gas engine 1 can switch to lean burn operation (excess air ratio $\lambda=1.4$ to 1.6). The shift to lean burn operation (excess air ratio $\lambda=1.4$ to 1.6) can be done smoothly because the control of the excess air ratio has already been taken over from the valve unit 21 for stoichiometric operation by the valve unit 22 for lean burn operation, in the excess air ratio region ($\lambda=1$) at the stoichiometric air-fuel ratio. As a result, the gas engine 1 can smoothly pass through the excess air ratio region ($\lambda=1$ to 1.3) where NOx emission is high, and can minimize NOx emission due to the switching operation.

During lean burn operation as described above, if the driving environment requires a high-power operation, the gas engine 1 switches from lean burn operation (excess air ratio $\lambda=1.4$ to 1.6) back to stoichiometric operation at the stoichiometric air-fuel ratio (excess air ratio $\lambda=1$).

A switching operation from lean burn operation to stoichiometric operation is described with reference to FIG. 3. The valve opening rate of the valve unit 22 for lean burn operation is increased to 100%, i.e. in the fully open state, so as not to interfere with the valve unit 21 for stoichiometric operation while the valve unit 21 controls the excess air ratio $\lambda$ to 1. However, while the valve unit 22 for lean burn operation increases the opening area, the excess air ratio decreases undesirably. In addition, since the excess air ratio goes down to the stoichiometric air-fuel ratio ($\lambda=1$) before the valve opening rate is 100%, if the valve unit 22 is opened any further, the excess air ratio will be lower than the stoichiometric air-fuel ratio ($\lambda=1$). Hence, in the excess air ratio region below the stoichiometric air-fuel ratio ($\lambda=1$), the valve opening rate of the valve unit 21 for stoichiometric operation, which has been fully open so as not to interfere with lean burn operation, is gradually decreased from 100%, in synchronization with the increase in the opening area of the valve unit 22 for lean burn operation. Since the opening area of the valve unit 21 for stoichiometric operation decreases, the control of the excess air ratio is taken over from the valve unit 22 for lean burn operation to the valve unit 21 for stoichiometric operation, with the excess air ratio being substantially kept at the stoichiometric air-fuel ratio ($\lambda=1$). Also in this case, in order to synchronize the decrease in the opening area of the valve unit 21 for stoichiometric operation with the increase in the opening area of the valve unit 22 for lean burn operation, the change in the valve opening rate of the valve unit 21 for stoichiometric operation relative to the change in the valve opening rate of the valve unit 22 for lean burn operation is computationally estimated. Specifically, the computational estimation is performed such that the rate of increase in the opening area resulting from the change in the valve opening rate of the valve unit 22 for lean burn operation matches the rate of decrease in the opening area resulting from the change in valve opening rate of the valve unit 21 for stoichiometric operation, based on the control accuracy of the valve unit 22 for lean burn operation and the control accuracy of the valve unit 21 for stoichiometric operation. In this case, the excess air ratio shifts to the stoichiometric air-fuel ratio region ($\lambda=1$) under the control of the valve unit 22 for lean burn operation. Then, in the excess air ratio region at the stoichiometric air-fuel ratio ($\lambda=1$), the control of the excess air ratio is taken over from the valve unit 22 for lean burn operation by the valve unit 21 for stoichiometric operation. Hence, the excess air ratio can smoothly shift from the lean burn operation region (excess air ratio $\lambda=1.4$ to 1.6) to the stoichiometric air-fuel ratio region ($\lambda=1$). As a result, the gas engine 1 can smoothly pass through the excess air ratio region ($\lambda=1$ to 1.3) where the NOx emission is high, and can minimize NOx emission due to the switching operation.

Figure 4:
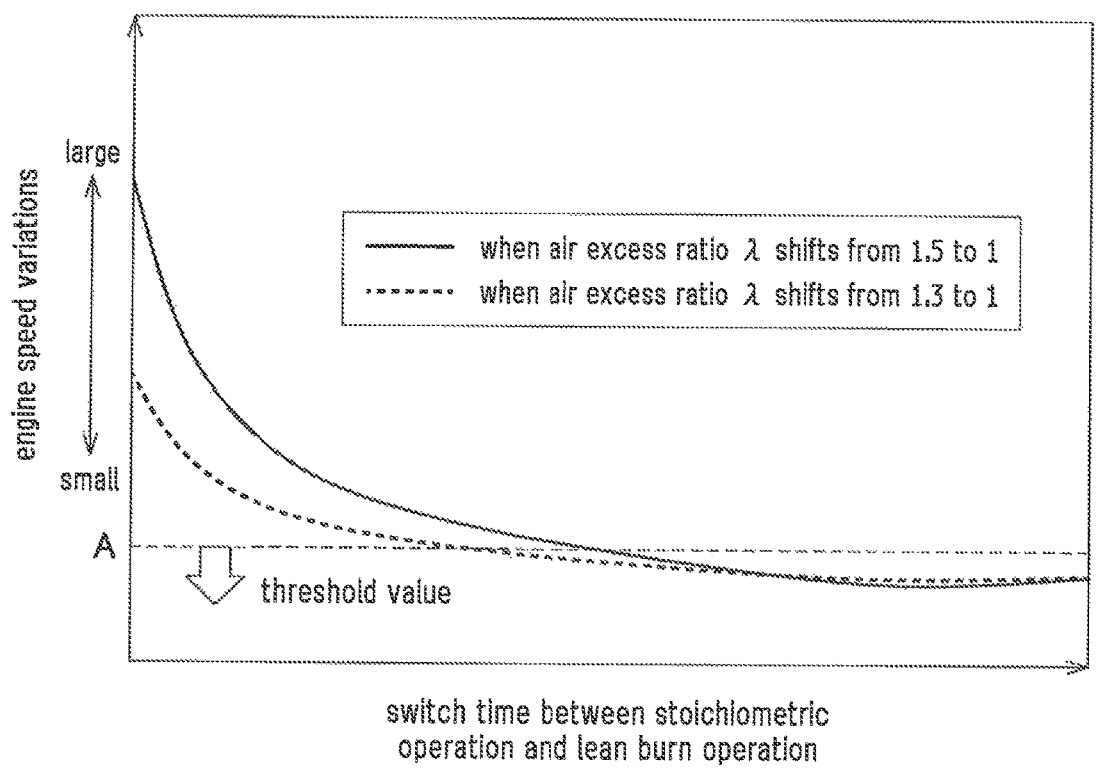
FIG. 4 is a graph showing a relationship between shift time and engine speed variations, while the gas engine according to the present invention shifts from lean burn operation to stoichiometric operation.

Turning to FIG. 4, if the shift from lean burn operation (excess air ratio $\lambda$1.4 to 1.6) to stoichiometric operation at the stoichiometric air-fuel ratio (excess air ratio $\lambda=1$) is effected drastically in a short time, such a shift causes engine speed variations and damages the gas engine 1 and elements driven by the gas engine 1. In the gas engine 1 according to the present invention, since the shift period can be freely set by controlling the valve unit 22 for lean burn operation, the switching operation can take sufficient time to keep the engine speed variations in the gas engine 1 not higher than a predetermined threshold value A so as not to damage the gas engine 1 and other elements.

Thereafter, stoichiometric operation at the stoichiometric air-fuel ratio ($\lambda=1$) can he controlled by controlling the valve opening rate of the valve unit 21 for stoichiometric operation. In this stoichiometric operation region, the control of the excess air ratio has been taken over from the valve unit 22 for lean burn operation by the valve unit 21 for stoichiometric operation, Hence, the excess air ratio can be controlled to the stoichiometric air-fuel ratio ($\lambda=1$) with excellent control. accuracy.

Further, in stoichiometric control, the valve response speed needs to be faster than in lean burn control. In this embodiment, the valve unit 21 for stoichiometric operation is located closer to the mixer 24 than the valve unit 22 for lean burn operation. Closer arrangement of the valve unit 21 for stoichiometric operation and the mixer 24 can reduce gas accumulation, which leads to a reduction in control delay.

When the thus configured gas engine 1 is switched from lean burn operation to stoichiometric operation, or vice versa, the gas engine 1 can minimize NOx emission due to the switching operation by smoothly passing through the excess air ratio region where NOx emission is high ($\lambda=1$ to 1.3). In addition, it is possible to prevent the gas engine 1 from being damaged due to variations in engine speed.

Further in this embodiment, during stoichiometric operation where the excess air ratio needs to be controlled to the stoichiometric air-fuel ratio ($\lambda=1$) with pinpoint control accuracy, the excess air ratio is controlled by the valve unit 21 for stoichiometric operation. By allowing the valve unit 21 for stoichiometric operation and the valve unit 22 for lean burn operation to switch between each other, this embodiment can effect lean burn operation and stoichiometric operation compatibly.

The thus configured gas engine 1 can be suitably used as a drive source in a gas heat pump system (not shown). A gas heat pump system requires a high engine load in summer and winter, but can sufficiently operate with medium- and low- engine load in spring and autumn. Usually, the gas engine 1 drives a plurality of compressors under high-load conditions, but drives a single compressor under low-load conditions. Hence, the gas heat pump system using this gas engine 1 can operate in lean burn mode under medium- and low-load conditions, and can switch to stoichiometric mode under high-load conditions. Such a heat pump system can cut the cost by using a small-displacement gas engine 1.

Additionally, under high load conditions, thermal efficiency decreases because the gas heat pump system operates in stoichiometric mode. At the same time, however, mechanical efficiency increases because a plurality of compressors are driven. In total, thermal efficiency under high-load conditions in stoichiometric mode is equivalent to thermal efficiency under medium- and low-load conditions in lean burn mode. Obviously, thermal efficiency under medium- and low-load conditions is excellent because the gas heat pump system operates in lean burn mode. Therefore, such a gas heat pump system can improve the annual performance factor (APF).

Further, this gas engine 1 can be suitably used as a drive source in a cogeneration system (not shown). The cogeneration system operates in lean burn mode during normal operation. When switched to a high-load heat-oriented operation, the cogeneration system operates in stoichiometric mode. In this manner, the cogeneration system can save energy.

The present invention can be embodied and practiced in other different forms without departing from the spirit and essential characteristics of the present invention. Therefore, the above-described embodiment is considered in all respects as illustrative and not restrictive, The scope of the invention is indicated by the appended claims rather than by the foregoing description. All variations and modifications falling within the equivalency range of the appended claims are intended to be embraced therein.

INDUSTRIAL APPLICABILITY

The gas engine according to the present invention is used as a drive source in various types of energy-saving equipment.

DESCRIPTION OF THE REFERENCE NUMERALS

1 gas engine
2 valve
21 valve unit for stoichiometric operation
22 valve unit for lean burn operation
23 regulator
24 mixer

The invention claimed is:

1. A gas engine which operates in stoichiometric mode under high-load conditions and which operates in lean burn mode under medium- and low-load conditions,
   comprising a valve which supplies the gas engine with an air-fuel mixture composed of air and fuel gas, the valve being composed of a valve unit for stoichiometric operation for achieving the excess air ratio for stoichiometric operation and a valve unit for lean burn operation for achieving the excess air ratio for lean burn operation, the valve unit for stoichiometric operation being connected in series to the valve unit for lean burn operation and being connected to an intake side of the engine,
   wherein an opening area of the valve is controlled by operating the valve unit for stoichiometric operation to control an opening area of the valve unit for stoichiometric operation in an inverse relationship to the operation of the valve unit for lean burn operation to control an opening area of the valve unit for lean burn operation in such a manner as:
   to ensure a predetermined opening area for achieving an excess air ratio for stoichiometric operation;
   during a switching operation from stoichiometric operation to lean burn operation, to uniformly decrease the opening area and increase the excess air ratio over time until the switching operation from stoichiometric operation to lean burn operation ends;
   to ensure a predetermined opening area for achieving an excess air ratio for lean burn operation; and
   during a switching operation from lean burn operation to stoichiometric operation, to uniformly increase the opening area and decrease the excess air ratio over time until the switching operation from lean burn operation to stoichiometric operation ends.

2. The gas engine according to claim 1, wherein
   during stoichiometric operation, the opening area of the valve changes in response to the opening area of the valve unit for stoichiometric operation, with the valve unit for lean burn operation being kept fully open, and
   during the switching operation from stoichiometric operation to lean burn operation, the opening area of the valve changes by opening the valve unit for stoichiometric operation fully and closing the valve unit for lean burn operation.

3. The gas engine according to claim 1, wherein during lean burn operation, the opening area of the valve changes in response to the opening area of the valve unit for lean burn operation, with the valve unit for stoichiometric operation being kept fully open, and during the switching operation from lean burn operation to stoichiometric operation, the opening area of the valve changes by opening the valve unit for lean burn operation fully and closing the valve unit for stoichiometric operation.

4. The gas engine according to claim 2, wherein during the switching operation from stoichiometric operation to lean burn operation or the switching operation from lean burn operation to stoichiometric operation, the opening area of the valve is controlled by computationally estimating a sum of an opening area of the valve unit for stoichiometric operation and an opening area of the valve unit for lean burn operation.

5. A gas heat pump system comprising the gas engine according to claim 1.

6. A cogeneration system comprising the gas engine according to claim 1.

7. A method for controlling a gas engine which operates in stoichiometric mode under high-load conditions and which operates in lean burn mode under medium- and low-load conditions, the gas engine comprising a valve which supplies the gas engine with an air-fuel mixture composed of air and fuel gas, the valve being composed of a valve unit for stoichiometric operation for achieving the excess air ratio for stoichiometric operation and a valve unit for lean burn operation for achieving the excess air ratio for lean burn operation, the valve unit for stoichiometric operation being connected in series to the valve unit for lean burn operation and being connected to an intake side of the engine, the method comprising the step of controlling an opening area of the valve by:

operating the valve unit for stoichiometric operation to control an opening area of the unit for stoichiometric operation in an inverse relationship to the operation of the valve unit for lean burn operation to control an opening area of the valve unit for burn operation;

during stoichiometric operation, ensuring a predetermined opening area for achieving an excess air ratio for stoichiometric operation, wherein the opening area of the valve is controlled by the valve unit for stoichiometric operation while the valve unit for lean burn operation is kept fully open;

during a switching operation from stoichiometric operation to lean burn operation, uniformly decreasing the opening area and increasing the excess air ratio over time until the switching operation from stoichiometric operation to lean burn operation ends, wherein the opening area of the valve is controlled by opening the valve unit for stoichiometric operation fully and closing the valve unit for lean burn operation;

during lean burn operation, ensuring a predetermined opening area for achieving an excess air ratio for lean burn operation, wherein the opening area of the valve is controlled by the valve unit for lean burn operation while the valve unit for stoichiometric operation is kept fully open; and during a switching operation from lean burn operation to stoichiometric operation, uniformly increasing the opening area and decreasing the excess air ratio over time until the switching operation from lean burn operation to stoichiometric operation ends, wherein the opening area of the valve is controlled by opening the valve unit for lean burn operation fully and closing the valve unit for stoichiometric operation.

8. The gas engine according to claim 3, wherein during the switching operation from stoichiometric operation to lean burn operation or the switching operation from lean burn operation to stoichiometric operation, the opening area of the valve is controlled by computationally estimating a sum of an opening area of the valve unit for stoichiometric operation and an opening area of the valve unit for lean burn operation.

9. A gas heat pump system comprising the gas engine according to claim 2.

10. A gas heat pump system comprising the gas engine according to claim 3.

11. A gas heat pump system comprising the gas engine according to claim 4.

12. A gas heat pump system comprising the gas engine according to claim 8.

13. A cogeneration system comprising the gas engine according to claim 2.

14. A cogeneration system comprising the gas engine according to claim 3.

15. A cogeneration system comprising the gas engine according to claim 4.

16. A cogeneration system comprising the gas engine according to claim 8.

17. The gas engine of claim 1 further comprising operating the valve unit for lean burn operation to control an opening area of the valve unit for lean burn operation in an inverse relationship to the operation of the valve unit for stoichiometric operation to control an opening area of the valve unit stoichiometric operation.

* * * * *